July 13, 1971  J. R. BLIZARD  3,592,726
COMPOSITE VEHICLE CLOSURE COMPRISING AN INNER SHEET
OF CHEMICALLY STRENGTHENED GLASS
Filed Nov. 24, 1969  3 Sheets-Sheet 1
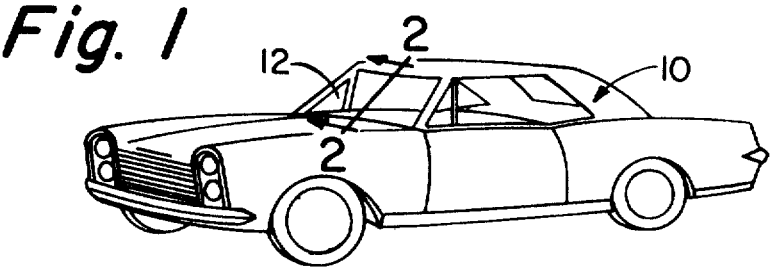
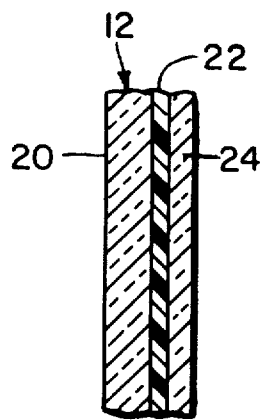
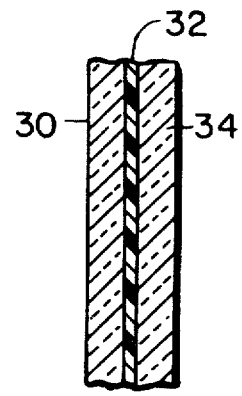
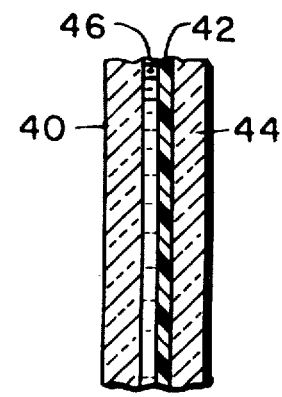
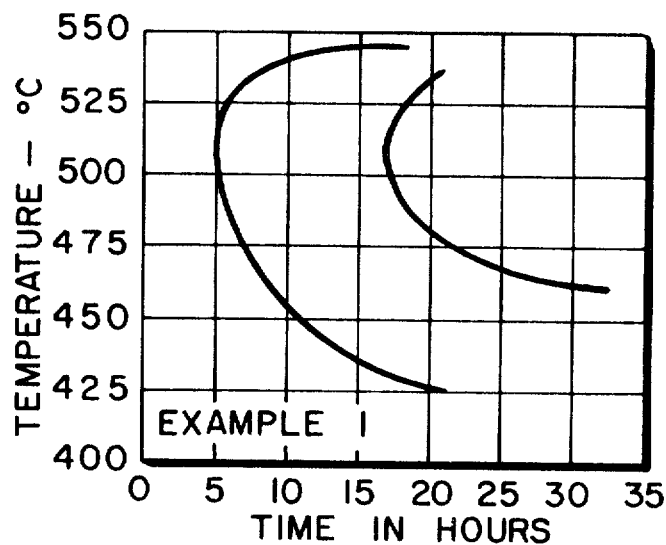
INVENTOR.
John R. Blizard
BY
ATTORNEY

United States Patent Office

3,592,726
Patented July 13, 1971

---

3,592,726
COMPOSITE VEHICLE CLOSURE COMPRISING AN INNER SHEET OF CHEMICALLY STRENGTHENED GLASS
John R. Blizard, Corning, N.Y., assignor to Corning Glass Works, Corning, N.Y.
Continuation-in-part of application Ser. No. 451,484, Apr. 28, 1965. This application Nov. 24, 1969, Ser. No. 879,317
Int. Cl. B32b 7/06, 17/10
U.S. Cl. 161—164                                     3 Claims

ABSTRACT OF THE DISCLOSURE

This invention relates to a multi-layer glass article suitable for use as a vehicle closure such as, for example, an automobile windshield. More specifically, this invention relates to vehicle closures comprising an inner sheet of chemically strengthened glass bonded by a transparent plastic interlayer to an outer sheet of glass which, if strengthened at all, is strengthened to a lesser degree than the inner sheet. The inner sheet has a greater resistance to fracture by a blunt object than the outer, a greater ability to flex than the outer, and will dice into very small particles when fractured if heavily impacted.

---

This application is a continuation-in-part of my copending application, Ser. No. 451,484, filed Apr. 28, 1965 and now abandoned.

Vehicle closures, particularly windshields, are almost universally produced from glass because of the characteristic features of transparency and resistance to abrasion and weathering. However, glass is a brittle material that ordinarily breaks into sharp, jagged pieces. Consequently, automobile windows, and the windshield in particular, have long been recognized as a major factor in personal injury accidents.

Current North American practice requires that windshields be made with laminated glass. This has greatly reduced the danger of laceration to occupants from jagged edges of broken glass and from large flying fragments. However, even though all windshields in American automobiles are now laminated, the windshield is still one of the three or four principal sources of personal injury.

Injury occurs when a occupant is thrown against the windshield with sufficient impact to break the glass. The person may either penetrate through the plastic interlayer so that his face, ears and throat are exposed to sharp glass cutting edges, or may be held within the vehicle by the plastic web but come into harsh sliding contact with large sharp and jagged spears that are still clinging to the plastic web.

Elsewhere, it is customary to use a windshield consisting of a single sheet of quarter inch thick, thermally tempered glass which breaks into small, relatively harmless, granular particles that do not have the sharp cutting edges found on pieces of conventional laminated windshields. However, the tempered windshield has certain serious drawbacks that have caused it to be unacceptable in North America. Its inherently stiff and unyielding nature enhances the possibility of a skull fracture, rather than glass fracture, when a passenger's head collides with the windshield in an accident. In the event breakage does occur, there is no restraint against occupant penetration such as afforded by the plastic interlayer in a laminated assembly. Also, if one of these windshields is broken by external impact, such as a stone thrown up from the roadside, the network of cracks is so dense that vision is obscured and the driver cannot see the road. This situation is extremely hazardous on a high speed roadway. It is therefore a primary purpose of the invention to provide an improved windshield embodying the principles of the laminated type.

In particular, the invention provides a windshield that is capable of absorbing considerable impact from a human body without causing serious shock or concussion forces to or in such body. It further provides a windshield that, in most minor accidents, will not be broken at all; that, in the somewhat more severe accident will fail in the outer sheet only; and that, in the truly severe accident, will break in such a manner that the glass surface contacted by the passenger will not be seriously lacerative. It also provides a laminated type windshield in which rupture of the plastic interlayer may be avoided even though the glass may be broken. This latter is highly desirable in order to keep the vehicle occupant within the safety of the protective body shell of the vehicle, rather than being exposed to great danger by being thrown out. It additionally may provide a laminated automobile windshield with an outer skin that is sufficiently tough so that it cannot easily be damaged by flying stones or gravel, but that will still provide adequate vision for the driver even though it may become cracked or bruised by a stone impact.

My new windshield embodies the familiar concept of so-called safety glass; that is, two glass sheets and a plastic interlayer bonded to at least one of such sheets. The improved performance is achieved primarily through the characteristics of the individual glass sheets and the relationship of the characteristics of one sheet to those of the other. In particular, the sheets and interlayer are so designed and combined as to provide flexibility and resiliency in the product while still maintaining a high resistance to fracture. This allows the windshield to flex or "give" under impact while breakage is either avoided or delayed. This in turn cushions the blow by reducing the rate at which the impact velocity drops, thereby reducing the chance of skull or neck injury at the instant of impact.

The composite glass windshield of my invention is based on the structural concept of a differential in thickness and/or in mechanical strength of the component glass sheets. In particular, the inner sheet, that is the sheet facing the interior of the vehicle, is of such thickness and strength with relation to the outer sheet that it has a greater fracture resistance and greater flexibility with relation to such outer sheet. With these characteristics, the inner sheet tends to yield without breakage when impacted on its face by a blunt object such as an occupant's head or body. In turn, the outer sheet will tend to break with application of a lesser force than is required to break the inner sheet, thereby providing the full flexural benefits from the inner sheet. At the same time the outer sheet may be strengthened to a limited extent to increase its resistance to stone bruise fracture and the like.

The second concept upon which this invention is based is that of an inner glass sheet that fragments in such a manner, described later, that there is little or no tendency for a plastic interlayer to rupture. It is contemplated that there will be accidents where the windshield is hit with such a force that both inner and outer glasses are broken. In a preferred embodiment then, the thin inner pane with its high strength will dice or granulate into very small particles, and the outer pane, in the area at and surrounding the place of impact, will also break into many fragments. Since the fragments are held tightly to the plastic center layer, with only a very few pieces breaking away at the point of impact, the windshield becomes soft and limp. The small granular fragments on the inner surface form a flexible mosaic with very little ability to lacerate.

Thus, in the ultimate, or very severe, accident, the windshield described in this invention becomes a soft yielding membrane without the power to cause appreciable laceration. The glass breaks into many small pieces which do not easily pierce the plastic center membrane, and the large number of peices permit the plastic sheet to stretch rather than locally rupture. And, even if the plastic sheet should tear, the very fine glass particles will not be severely lacerative.

In its broadest aspect, my invention is a composite glass closure comprising spaced glass sheets and a transparent, plastic interlayer adherently bonded to the inner face of at least one of said glass sheets, the inner glass sheet having a greater resistance to fracture by a blunt object such as a head, and a greater degree of flexibility than the outer glass sheet. Preferably, but not necessarily, the inner glass sheet has a lesser thickness than the outer while being strengthened by compressive surface stresses to a greater degree than the outer sheet.

The invention is further described in greater detail with respect to the accompanying drawings wherein:

FIG. 1 is a sketch of a vehicle embodying a windshield in accordance with the invention;

FIG. 2 is a view along line 2—2 of FIG. 1;

FIG. 3 is a view in cross-section of a modification of FIG. 2;

FIG. 4 is a view in cross-section of a further embodiment of the invention;

FIGS. 5–8 are graphs setting out time-temperature schedules operable in making strengthened inner glass sheets for automobile windshields from sodium aluminosilicate glass compositions.

Figure 6:
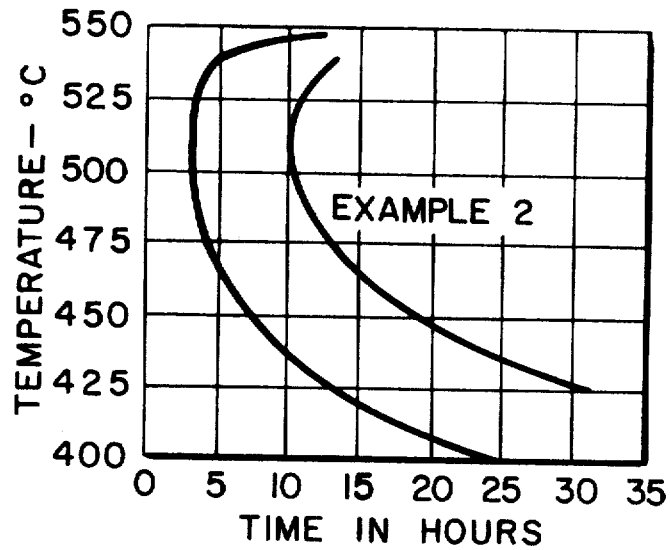
Figure 7:
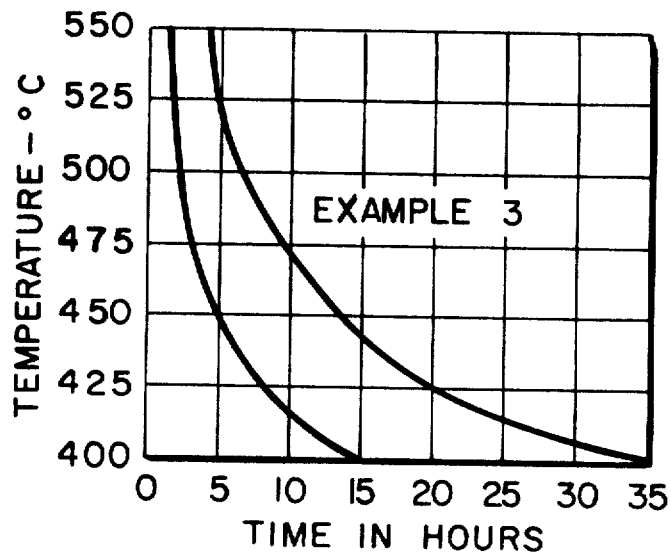
Figure 8:
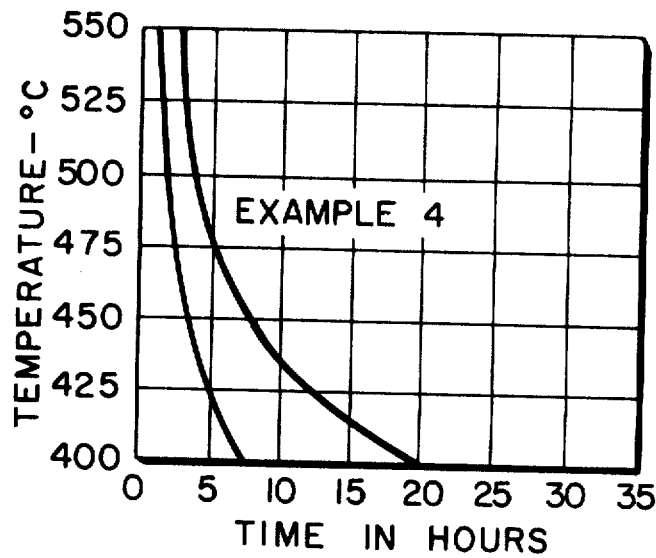

FIG. 1 shows a typical vehicle 10 having a windshield 12 mounted or affixed in conventional manner. As shown in FIG. 2, windshield 12 is composed of two glass sheets 20 and 24 of different thickness and laminated with a relatively thin interlayer 22.

FIG. 3 shows a windshield construction corresponding to FIG. 2, but modified in that glass sheets 30 and 34 are of equal thickness and are joined by a relatively thin interlayer 32. FIG. 4 shows a further embodiment of the invention in which sheet 40 is not laminated or bonded to sheet 44.

In FIG. 2, windshield 12 is designed to be mounted with sheet 20 as the outside sheet and sheet 24 as the inside sheet; that is, the sheet facing the interior of the vehicle. Outer sheet 20 has a substantially greater thickness than inner sheet 24, but is strengthened, if at all, to a lesser degree than sheet 24. This combination of greater thickness and lesser strength in the outer sheet insures that the inner sheet will have both a greater resistance to fracture due to its greater strength, and a greater degree of flexibility due to its being relatively thinner. Accordingly, when an object such as a passenger's head is thrown against the face of inner sheet 24 in the course of a collision, sheet 24 will tend to flex under the impact without breaking. Outer sheet 20 in turn will not flex as readily, but will tend to break under a severe impact. Such breakage will permit the full degree of flexibility attainable with inner sheet 24, thereby providing the maximum degree of cushioning under the circumstances.

Outer sheet 20 may be an annealed sheet of flat glass having no added strength but thick enough to resist stone impacts. If a thin outer sheet is desired, improved resistance to stone impact may be secured by imparting to outer sheet 20 a degree of strength that must, however, be appreciably less than that imparted to the inner sheet in order to prevent undue concussive forces being applied to a person's head when striking the windshield. Also, it is desirable to maintain the strength, with the concomitant internal central tension, of the outer sheet at a sufficiently low value that, in the event of fracture, breakage occurs in relatively large pieces that do not seriously hamper vision in the event of impact by a stone or the like.

The thickness of outer sheet 20 will depend on that of inner sheet 24 and on the degree of strengthening imparted. Initially then, outer sheet 20 must ordinarily be no thinner than inner sheet 24, and is preferably thicker. If outer sheet 20 is not strengthened, it should have a thickness of at least 0.100" to provide resistance to stone bruise type of damage. However, the thickness should not exceed 0.180" and a thickness of about 0.105" is generally preferred in unstrengthened glass to avoid undue mass and rigidity.

The weight and inherent rigidity or stiffness of even this glass thickness is undesirable. If we wish to employ a thinner glass sheet for outer sheet 20, then we would strengthen such thinner glass to a limited degree. In this case, the thickness of outer sheet 20 should be within the range 0.050"–0.120", preferably 0.080"–0.090", and preferably not be thinner than inner sheet 24.

The degree of permissible strength will vary inversely with thickness, so that a higher degree of strengthening may be employed in a sheet of minimum thickness. However, the degree of strengthening must not in any event be so great that the glass dices; that is, breaks into small fragments that would impair vision. The breakage pattern will vary somewhat in any sheet of glass, but, for present purposes, a dicing fracture is one in which more than 10% of the area breaks into fragments smaller than one square inch in area.

The lower limit for the thickness of inner sheet 24 is established mainly by the limitations of the glass forming or finishing processes. A sheet as thin as 0.040" might be used advantageously, for example, but the lowest practical thickness with present manufacturing techniques is 0.050". An upper limit on thickness of about 0.090" is preferred because of flexibility and anti-concussion considerations earlier explained, and a thickness no greater than 0.080" is even more desirable for this reason.

Inner sheet 24 must be strengthened sufficiently so that it will undergo substantial flexing without fracture. The minimum acceptable degree of strength will vary with thickness of the sheet. In general, it will be designed to provide an inner sheet having a fracture pattern such that the particles do not cut or rupture the plastic interlayer, do not have a serious lacerative potential, and produce a soft, flexible net or mat.

Table I below specifies the type of fracture pattern, in the event of heavy impact on the face of the glass, that is normally needed to meet the above requirements. The zones are centered on the point where fracture originates, a place that is obvious to those skilled in the art.

TABLE I

| | Maximum allowable particle size (square inches), inner sheet | | | |
|---|---|---|---|---|
| | Anywhere | | In 80% of the area | |
| | A[1] | B[2] | A[1] | B[2] |
| Zone 1 (within a 6" radius) | 1/4 | 1/2 | 1/20 | 1/10 |
| Zone 2 (within a 12" radius) | 1/2 | 1/2 | 1/12 | 1/4 |

[1] Desirable specification.
[2] Barely tolerable specification.

The actual resistance of sheet 24 to breakage or fracture on impact is conveniently defined in terms of a conventional ball drop test employed in vehicle glass specifications. In this test, a 12" x 12" glass sheet is edge supported and subjected to the impact of a half-pound steel ball dropped centrally on its face. In such a test, inner sheet 24 must withstand breakage with a ball drop of at least six (6) feet in ten out of twelve tests. The latter qualification is designed to eliminate stray defects which cause isolated failures.

It will be understood that impact resistance increases with size so that a typical passenger automobile windshield will withstand slightly, but not substantially, greater impacts than the smaller test pieces. Thus, a windshield might withstand a nine foot drop whereas a test square would withstand only an eight foot drop. Also, resistance increases with thickness so that a 0.060"–0.065" thick windshield may break at eight feet whereas an identically strengthened sheet of 0.080"–0.085" would not break until ten feet. However, a capability of withstanding at least a six foot drop will provide an adequate impact resistance within the range of dimensions normally contemplated.

Strength of glass is frequently expressed as modulus of rupture, a measure of flexural strength. However, for present purposes, this is not always an adequate specification. Thus, both the degree of compressive stress, as measured by modulus of rupture, and the depth and/or distribution of the stresses, as indicated by the stress pattern or compression-tension ratio, are involved. Accordingly, the more practical characterizing values of fracture pattern and impact resistance are employed for purposes of definition.

In some instances, it is desirable that the inner and outer sheets be of the same thickness. Specifically, this has the distinct advantage of permitting both glass sheets to be cut from a continuous ribbon of uniform thickness. Such a construction is shown in FIG. 3, wherein glass sheets 30 and 34 are of equal thickness. In this case, the benefits of the present invention must be attained entirely through differential strengthening of the two sheets. Accordingly, inner sheet 34 must be strengthened to a sufficiently greater degree than outer sheet 30 so that, as the composite is flexed, outer sheet 30 will break initially. It is desirable to maintain both sheets as thin as possible, and preferably below about 75 mils, in order to provide maximum flexibility and low mass. Otherwise, the same considerations as to thickness and strength will apply as outlined with reference to the structure FIG. 2.

FIG. 4 illustrates a rather different embodiment. Here, inner sheet 44 is spaced from, but not laminated to, outer sheet 40. Rather, a plastic layer 42 is bonded to one of the sheets. This is preferably inner sheet 44 as shown in the figure, but need not necessarily be so. Characteristically, a liquid, a grease, or a gel that wets both inner surfaces and is maintained in place by an edge seal of any conventional nature, is provided as indicated by numeral 46. This is necessary to reduce reflections from the inner surfaces, and is preferably a liquid of matching index of refraction.

In this embodiment, the maximum in flexibility is attained since the inner sheet is not directly restrained by the outer. Thus, the inner and outer can slide with respect to each other, greatly reducing the stiffness of the windshield structure. However, the presence of plastic web or layer 42 provides the restraining influence traditional in laminated glass construction. The thickness and strength features earlier described relative to FIGS. 2 and 3 will generally apply to this embodiment as well.

The invention is not limited to any particular manner of glass strengthening. However, the only practical known method of attaining the degree of strength required in the inner sheet is a chemical strengthening treatment of the type described in co-pending application Ser. No. 754,311, filed Aug. 21, 1968 as a continuation-in-part of Ser. No. 181,887, filed Mar. 23, 1962 and now abandoned, in the name of E. L. Mochel and assigned to a common assignee. Briefly, such method involves exchanging larger ions for smaller ions, e.g., potassium for sodium or sodium for lithium ions, in the surface layer of a glass. In accordance with the teaching of the indicated Mochel application, a relatively high degree of abraded strength; that is, strength characterized by a high modulus of rupture and relatively deep stressed layer, can be obtained, while maintaining transparency, by employing an alkali metal aluminosilicate type glass containing at least 5% alumina ($Al_2O_3$). The degree of strength attainable may be varied in a number of ways, for example, by employing different glasses, different treating temperatures and/or different times of treatment. However, it is generally convenient to employ a single glass composition and to obtain the desired degree of strength by varying the conditions of treatment.

By way of general illusration, outer sheet 20, 30, or 40 might be obtained from a rolled or drawn ribbon of a $Li_2O$-$Al_2O_3$-$SiO_2$ glass composed essentially of 62% $SiO_2$, 24% $Al_2O_3$, 7.5% $Na_2O$, 2% $MgO$, 3.5% $Li_2O$, and 1% $Sb_2O_3$. The glass may be strengthened by immersion in a molten salt bath of sodium nitrate ($NaNO_3$) at a temperature of 450° C. for times up to two (2) hours. At lower temperatures, the maximum time might be somewhat longer, whereas, at higher temperatures, it would normally be somewhat shorter.

Likewise, inner sheet 24, 34, or 44 might be made to a thickness of 0.065" giving the sheet a somewhat greater degree of strengthening. Thus, a four hour treatment in a $NaN_3$ bath at 450° C. followed by a five minute treatment in $KNO_3$ at 450° C. has been found adequate.

Alternatively, a $Na_2O$-$Al_2O_3$-$SiO_2$ glass, e.g., a glass composed of 63% $SiO_2$, 17% $Al_2O_3$, 13% $Na_2O$, 3.5% $K_2O$, 3.5% $MgO$, may be used to produce the sheets. Thus, a 0.085" thick sheet may be strengthened by immersion in a molten $KNO_3$ salt bath at 450° C. for times up to 2½ hours to provide the outer sheet. In turn, the inner sheet may be a 0.065" thick sheet treated in a $KNO_3$ bath at 525° C. for at least five hours.

By way of more explicitly illustrating the invention, reference is made to the following specific example described with reference to FIG. 2 of the drawing:

The $Li_2O$-$Al_2O_3$-$SiO_2$ glass described earlier was rolled into a continuous sheet from which was cut sections corresponding in shape to a conventional auto windshield.

Several of these sections were ground and polished to a thickness of approximately 0.065" to provide sheets corresponding to inner sheet 24 in FIG. 2. These sheets were then chemically strengthened by successive immersions in a series of molten salt baths. They were first immersed for two hours in a sodium nitrate bath at 450° C.; then for two hours at 425° C. in a bath composed of equal parts of sodium and potassium nitrates; then for five minutes in a potassium nitrate bath at 450° C. The resulting sheets were capable of passing the ball drop test described earlier with the ball being dropped from a height of eight feet. The treatment is one designed to impart high resistance to impact breakage, developing a modulus of rupture value that will range up to 60,000–80,000 p.s.i. depending on the method of measurement. When broken, a glass strengthened in this manner has a fracture pattern somewhat smaller than that set forth in Table I.

An equal number of sheets were then ground and polished to a thickness of approximately 0.085" to provide sheets corresponding to sheet 20 in FIG. 2. These sheets were then strengthened by immersion for one hour at 425° C. in the salt bath composed of equal parts sodium and potassium nitrates. This treatment was adapted to impart reasonably high impact resistance and a modulus of rupture value substantially lower than that for the inner sheet. Glass sheets strengthened by this treatment normally break in the drop ball test at below six feet and have a fracture pattern in which the pieces are generally one square inch in size or larger. These sheets were then paired, inner and outer, and were laminated with a 0.030" thick interlayer of polyvinyl butyral resin sheeting, as used in producing laminated glass for auto windshields. The standard oil autoclave procedure of laminating was employed.

The resulting laminated windshileds were then mounted in a standard frame and tested by impacting in a manner that very closely simulates the impact of a passenger in a car thereon, head first against the windshield. Impacts at varying velocities were made and effect on the windshields noted.

At velocities up to 12 miles per hour (m.p.h.), no fracture was observed; between 12 and 15 m.p.h., the outer sheet was broken but not the inner; at greater velocities up to 30 m.p.h. both inner and outer sheets coud be broken, the inner breaking into especially small, non-lacerative particles, while the plastic was not ruptured. In contrast, a conventional laminated windshield of eighth inch annealed glass sheets performs as follows:

Both glass layers will break at impacts at 8 m.p.h. At about 12 m.p.h. the broken windshield will bulge outwards and large sharp glass spears, will contact and lacerate the face of the person hitting it. In some cases, the plastic web will be torn and the head will protrude through. At about 24 m.p.h., the windshiled will be fully penetrated with severe laceration occurring.

A 6" x 6" laminated test piece, corresponding to the just described windshield construction except for the indicated smaller size, was produced for a simulated stone bruise test. This consisted in mounting the sample in a pair of edge clamps and impacting it at varying velocities with a missile simulating a stone. The missile was an eighth inch diameter metal ball bearing, mounted in a cylindrical carrier and having a total weight of 5.8 grams, and fired from an air gun at varying velocities. The sample survived impact at velocities up to 50 feet/second. When fracture did occur, the inner sheet remained intact, and the particles in the broken outer sheet, except within a half inch radius of the impact point, were sufficiently large to allow vision that was adequate for the safe operation of an automobile.

I have observed that to secure the desired mechanical strength and breakage characteristics to the inner glass sheets of automobile windshields the central tension of such sheets should range about 3000–6000 p.s.i., preferably between about 3500–5200 p.s.i., and the depth of the compression layer should be at least 0.003". The first values are readily obtainable empirically through polarimetric stress readings and the latter determinations through microscopic examinations of cross sections of the sheets. Therefore, the chemical strengthening treatments, i.e., the salt bath immersions, are conducted to secure these parameters.

FIGS. 5–9 report salt bath treatments operable in securing these characteristics to lithium and sodium aluminosilicate glasses within the disclosure of the above-mentioned Mochel application, Ser. No. 754,311, i.e., these glasses have compositions within the perferred composition field 10–25% alkali metal oxides, 5–25% $Al_2O_3$, and the remainder $SiO_2$. Hence, the curves set out in FIGS. 5–8 represent maximum and minimum times and temperatures of immersions in a bath of molten 100% $KNO_3$ to impart values of central tension of between 3500–5200 p.s.i. in four different sodium aluminosilicate glass compositions and a surface compression layer deeper than 0.003". In each example, the glass sheet was 0.070" thick. The approximate compositions for these glasses, in weight percent on the oxide basis, and the strain points thereof (°C.) are recorded below:

TABLE II

|  | 1 | 2 | 3 | 4 |
|---|---|---|---|---|
| $SiO_2$ (percent) | 63.9 | 62.4 | 61.4 | 59.9 |
| $Al_2O_3$ (percent) | 13.8 | 15.3 | 16.8 | 18.3 |
| $Na_2O$ (percent) | 13.4 | 13.4 | 12.7 | 12.7 |
| $K_2O$ (percent) | 3.0 | 3.0 | 3.6 | 3.6 |
| MgO (percent) | 4.1 | 4.1 | 3.7 | 3.7 |
| CaO (percent) | 0.5 | 0.5 | 0.2 | 0.2 |
| FeO (percent) | 0.4 | 0.4 |  |  |
| $Sb_2O_3$ (percent) | 0.6 | 0.6 |  |  |
| F (percent) | 0.3 | 0.3 |  |  |
| $As_2O_3$ (percent) |  |  | 0.8 | 0.8 |
| $TiO_2$ (percent) |  |  | 0.8 | 0.8 |
| Strain point (°C.) | 528 | 539 | 581 | 590 |

The curves reflect the fact that the rate of the ion exchange reaction is directly related to the temperature at which the reaction is carried out. The curves also illustrate that, as the temperature at which the ion exchange is undertaken approaches and exceeds the strain point of the glass, stress release becomes an important factor. Hence, at such temperatures one is not able to attain high stresses and longer immersion times merely reduce the compression through stress release. FIGS. 5 and 6, reporting immersion treatments on Examples 1 and 2 having strain points of 539° C. and 528° C., respectively, clearly demonstrate this phenomenon. Thus, at the higher temperatures recorded, the curves turn back to longer times because of stress release and at these higher temperatures stress is released essentially as rapidly as stress is imparted to the surface layer during the ion exchange reaction.

Figure 9:
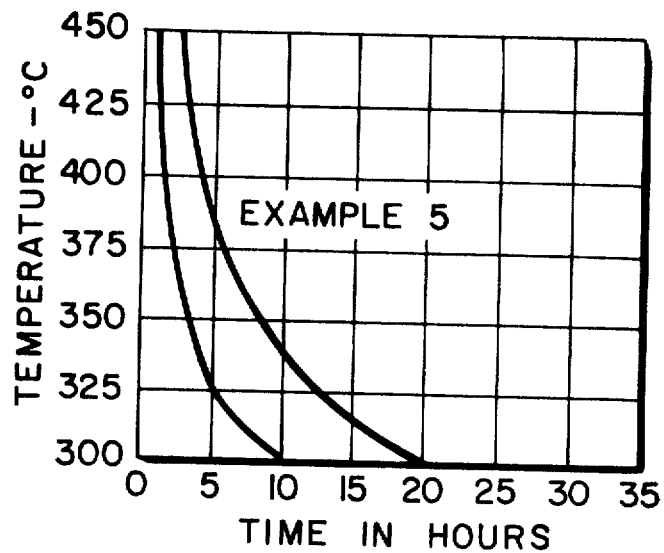
FIG. 9 is a graph depicting time-temperature schedules operable in making strengthened inner glass sheet for automobile windshields from lithium aluminosilicate glass compositions.

FIG. 9 sets out curves representing maximum and minimum times and temperatures of immersions in a bath of 100% $NaNO_3$ required to produce values of central tension of between 3500–5200 p.s.i. and a surface compression layer deeper than 0.003" in a lithium aluminosilicate glass sheet of 0.070" thickness. The approximate composition for this glass, in weight percent on the oxide basis, and the strain point thereof (°C.) are listed below:

$SiO_2$ ---------- percent -- 62.0
$Al_2O_3$ ---------- do ---- 24.2
$Na_2O$ ---------- do ---- 7.2
$K_2O$ ---------- do ---- 0.1
MgO ---------- do ---- 1.9
$Li_2O$ ---------- do ---- 3.6
$Sb_2O_3$ ---------- do ---- 1.0
Strain point ---------- °C -- 566

An immersion time greater than 24 hours has been deemed unattractive commercially, so FIGS. 5–9 have been limited to immersion temperatures which permit the accomplishment of the desired central tension and fracture characteristics within a commercially practical time.

It will be understood that the invention is subject to numerous variations and modifications within the scope of the appended claims and is not limited to the specific details described for illustration purposes. In particular, the invention is not limited to any particular glass or method of strengthening, except as unavailability of effective alternatives may inherently create such limitations.

I claim:
1. A vehicle closure comprising an inner glass sheet having a thickness between about 0.040"–0.090", an outer glass sheet having a thickness between about 0.050"–0.180", and intermediate thereto a transparent plastic layer adherently bonded to the opposing faces of said inner and outer sheets, wherein at least the inner sheet consists essentially, by weight on the oxide basis, of about 10–25% alkali metal oxide, 5–25% $Al_2O_3$, and the remainder $SiO_2$ which is chemically strengthened to provide a compressively stressed surface layer and a central tension of between about 3000–6000 p.s.i. so that the inner sheet has

(1) a greater resistance to fracture by a blunt object than the outer sheet,
(2) a greater ability to flex than the outer sheet, and (3) the capability when massively impacted to dice rather than form large pieces of glass as does the outer sheet.

2. A vehicle closure according to claim 1 wherein said compressively stressed surface layer has a depth of at least 0.003".

3. A vehicle closure according to claim 1 wherein said central tension ranges between about 3500–5200 p.s.i.

References Cited

UNITED STATES PATENTS

| | | | |
|---|---|---|---|
| 2,263,249 | 9/1939 | Rogers | 88—65 |
| 2,924,485 | 2/1960 | Miles | 296—84 |
| 2,946,711 | 7/1960 | Bragaw, Jr., et al. | 161—199 |
| 3,282,772 | 11/1966 | Davis, Sr. | 161—165 |
| 3,287,201 | 11/1966 | Chisholm et al. | 161—1 |
| 3,396,075 | 8/1968 | Morris | 161—199 |

JOHN T. GOOLKASIAN, Primary Examiner

D. J. FRITSCH, Assistant Examiner

U.S. Cl. X.R.

161—125, 165, 166, 199